Nov. 8, 1949 G. J. LEXA 2,487,150
CYCLIC CONTROL
Filed April 29, 1948
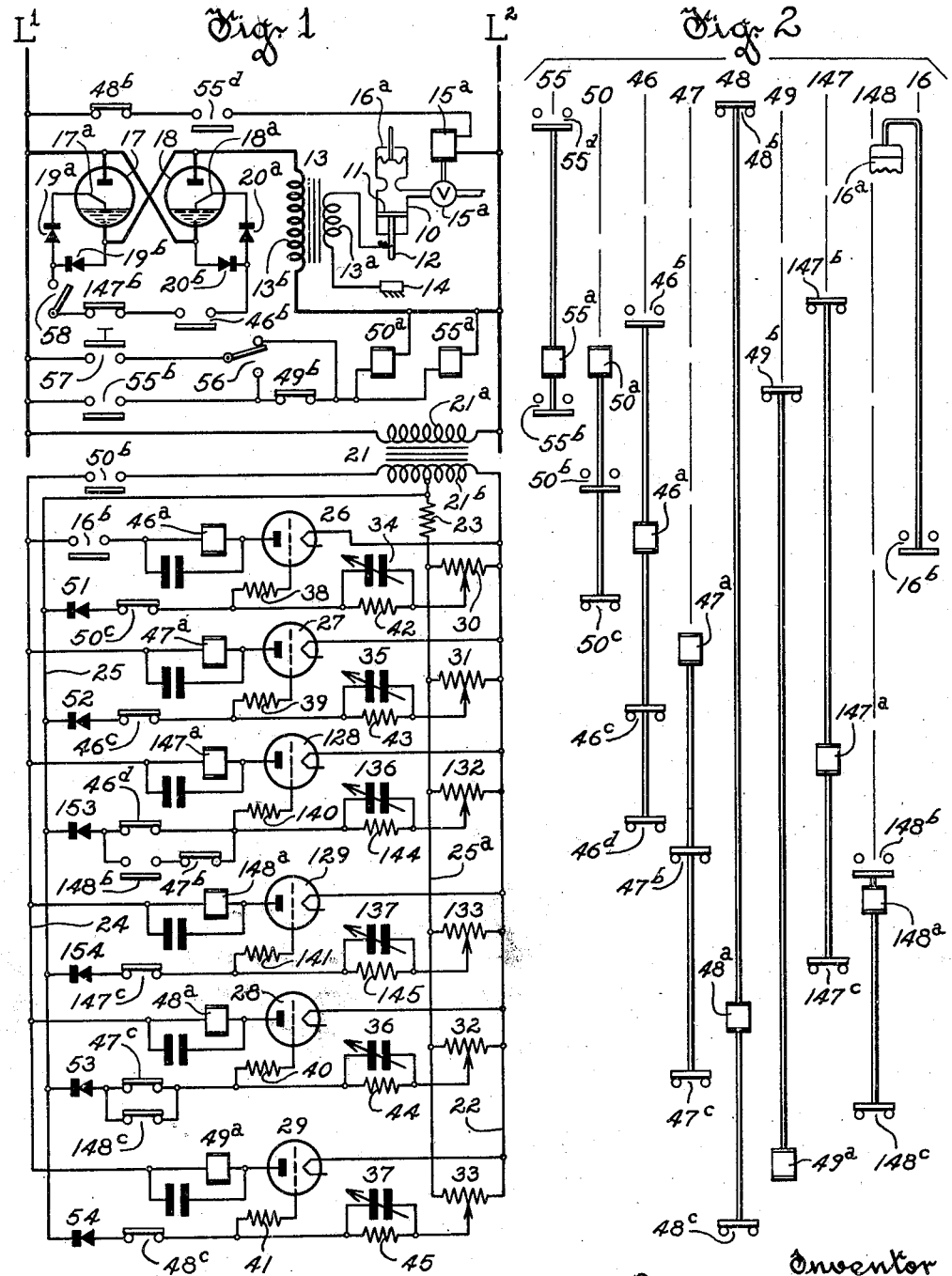

Patented Nov. 8, 1949

2,487,150

UNITED STATES PATENT OFFICE 2,487,150

CYCLIC CONTROL

George J. Lexa, Wauwatosa, Wis., assignor to Cutler-Hammer, Inc., Milwaukee, Wis., a corporation of Delaware Application April 29, 1948, Serial No. 24,031

7 Claims. (Cl. 315—246)

The invention relates to a cycle controller and while not limited thereto is particularly applicable to electric resistance welding systems.

The invention is an improvement of the cycle controller disclosed and claimed in my application Serial Number 742,639, filed April 19, 1947, now Patent No. 2,476,882.

In the aforementioned application a system was disclosed which affords cyclic operation in a series of successive steps, the order of succession of such steps being fixed but the time intervals between steps being adjustable. In the present system the order of succession of such steps may be preserved while an early step may be optionally varied in characteristics as by repetition to afford different pre-selected programs of operation. Thus when employed for electric resistance welding it is possible, after the parts to be welded are forced into intimate contact with each other, to supply to the weld a number of accurately measured welding current pulses interspersed by timed periods when no current flows to afford a certain amount of intermediate cooling of the weld. During such cooling periods the initial pressure applied to the weld is maintained.

Another object of the present invention is to provide in a welding controller or the like accurate independent adjustment of the several time intervals of a cycle of operation.

Another object is to provide a cycle controller in which certain steps of the cycle may be repeated a varying number of times during a single cycle as may be preselected.

Another object is to provide a cycle controller which affords division of the time period of a given step into a selected number of fractional periods each of preselected duration.

Other objects and advantages of the invention will hereinafter appear.

The accompanying drawing is illustrative of an embodiment of the invention. In the drawing, Figure 1 is a diagram of connections of the various parts of the system, while Fig. 2 shows diagrammatically the mechanical relationship of the various elements of the system illustrated in Fig. 1.

Referring to the drawing, a hydraulic welding machine is represented by a cylinder 10 having a piston 11, to which is attached one electrode 12 connected to one terminal of a secondary winding 13$^a$ of a welding transformer 13 having a primary winding 13$^b$. The second terminal of the winding 13$^a$ is connected to a stationary anvil or electrode 14 of the welding machine. The parts to be welded together are introduced between the jaws 12 and 14 so that when the jaws are pressed together and the transformer 13 is energized, welding current passes between the jaws and through the parts to be welded to heat the parts to welding temperature.

The cylinder 10 is supplied with actuating pressure fluid from any convenient source through a normally closed valve 15$^a$ having an electromagnetic operating winding 15$^b$, which when energized opens the valve 15$^a$ to admit pressure fluid to the cylinder 10. The pressure cylinder is also provided with a pressure responsive relay 16$^a$, which as indicated in Fig. 2 is provided with normally open contacts 16$^b$. The winding 15$^b$ is supplied with energy from alternating current bus bars L$^1$, L$^2$, in a manner which will be described hereinafter.

Connected between the lines L$^1$, L$^2$, and in series with transformer winding 13$^b$ in inverse parallel with each other are the ignitrons 17 and 18. The ignition electrode 18$^a$ of ignitron 18 is connected through two half wave rectifiers 20$^a$ and 20$^b$ to the anode of ignitron 17, and the ignition electrode 17$^a$ of ignitron 17 is similarly connected through two half wave rectifiers 19$^a$ and 19$^b$ to the anode of ignitron 18. There is also connected across lines L$^1$, L$^2$ a primary winding 21$^a$ of a transformer 21, which has a secondary winding 21$^b$ provided with an intermediate current tap. One end terminal of the winding 21$^b$ is connected to a bus bar 22. The intermediate tap is connected through a resistor 23 to a bus bar 25$^a$, while the other end terminal of the winding 21$^b$ is connected through normally disengaged contacts 50$^b$ to a bus bar 24. The intermediate tap of the winding 21$^b$ is also connected directly to a bus bar 25.

The system further includes the following electro-magnetic relays: relay 46 having an energizing winding 46$^a$, normally open contacts 46$^b$ and normally closed contacts 46$^c$ and 46$^d$; relay 47, having a winding 47$^a$ and normally closed contacts 47$^b$ and 47$^c$; relay 48 having a winding 48$^a$, and normally closed contacts 48$^b$ and 48$^c$; relay 49, having a winding 49$^a$, and normally closed contacts 49$^b$; relay 50 having a winding 50$^a$, normally open contacts 50$^b$ and normally closed contacts 50$^c$; relay 55, having a winding 55$^a$, normally open contacts 55$^b$ and 55$^d$; relay 147, having a winding 147$^a$ and normally closed contacts 147$^b$ and 147$^c$, and relay 148, having a winding 148$^a$, normally open contacts 148$^b$ and normally closed contacts 148$^c$.

Connected to the bus bar 22 are the cathodes of gaseous tubes 26, 27, 28, 29, 128 and 129, respectively. Connected in parallel with one another across the bus bars 22 and 25$^a$ are potentiometer resistors 30, 31, 32, 33, 132 and 133, respectively. The movable contacts of said resistors are connected in series with adjustable capacitors 34, 35, 36, 37, 136 and 137, respectively, and current limiting resistors 38, 39, 40, 41, 140 and 141, respectively, to the control electrodes of the tubes 26, 27, 28, 29, 128 and 129, respectively. The capacitors are paralleled by discharge resistors 42, 43, 44, 45, 144 and 145, respectively. The anodes of the aforementioned tubes are each connected to one of the terminals of the energizing windings 46$^a$, 47$^a$, 48$^a$, 49$^a$, 147 and 148, respectively. Each of the foregoing windings is preferably paralleled by a smoothing capacitor. The second terminal of winding 46$^a$ is connected through normally open contacts 16$^b$ to the bus bar 24. The common points of resistors 42 and 38, resistors 43 and 39, resistors 44 and 40, resistors 45 and 41, 144 and 140, 145 and 141 are connected through normally closed contacts 50$^c$, 46$^c$, 47$^c$, 48$^c$, 46$^d$ and 147$^c$, respectively, and in series with half wave rectifiers 51, 52, 53, 54, 153 and 154, respectively, to the bus bar 25.

The windings 50$^a$ and 55$^a$ are connected in parallel with one another and in series with contacts 55$^b$ and 49$^b$ across the lines L$^1$ and L$^2$. A double throw single pole switch 56 when in one position connects a normally open push button switch 57 in parallel with the contacts 55$^b$, while in the other position it connects the push button switch 57 in parallel with both contacts 55$^b$ and 49$^b$.

The operation of the system thus far described is as follows: Let it be assumed that it is desired to produce a single welding current impulse. It is to be observed that with the lines L$^1$, L$^2$ energized the capacitors 34 to 37, 136 and 137 are charged to block conduction of the respective tubes. With switch 58 closed the switch 56 is moved to the position shown in the drawing and the push button switch 57 is closed. This energizes coils 50$^a$ and 55$^a$, thereby closing contacts 55$^b$, 55$^d$ and 50$^b$, and opening contacts 50$^c$. This in turn energizes valve solenoid 15$^b$ to open valve 15$^a$ and admit pressure fluid to cylinder 11 to move electrode 12 towards the workpiece 14. When the electrode 12 exerts pressure on the workpiece and the pressure of the cylinder 10 reaches the desired value, the pressure relay 16$^a$ closes contacts 16$^b$. Closure of contacts 55$^b$ provides a maintaining circuit for coils 50$^a$ and 55$^a$ through the contacts 55$^b$ and 49$^b$ in parallel with the push button switch 57 which may now be released.

Opening of contacts 50$^c$ opens the charging circuit for capacitor 34, and the latter gradually discharges through resistor 42. After a time interval the potential of the grid of tube 26 has been reduced so as to permit conduction of said tube. It will be observed that the voltage which is impressed on the control electrode of tube 26 consists of a unidirectional voltage component impressed thereupon by the capacitor 34 and an alternating potential derived from the potentiometer resistor 30. It will also be observed that the alternating potential is substantially in phase with the potential impressed upon the main electrodes of the tube 26. As a result the rate of change of the resultant voltage impressed upon the aforementioned control electrode at the moment it passes through the critical voltage value at which the tube 26 becomes conducting, is relatively high even though the rate of change of the capacitor voltage is relatively low, thus affording a very precise control of the instant at which the tube 26 becomes conducting during the positive half cycle of the voltage impressed thereon. The same observation also holds true for the operation of the other tubes 27 to 29, inclusive, 128 and 129. As soon as tube 26 conducts the coil 46$^a$ is energized to close contacts 46$^b$, which completes the circuit for energizing the ignition electrodes 17$^a$ and 18$^a$ so that tubes 17 and 18 conduct current through the primary winding 13$^a$, which causes supply of welding current to the work. Energization of coil 46$^a$ also opens contacts 46$^c$ and 46$^d$. This causes capacitor 35 to discharge to unblock after a time interval tube 27 and thereby energize coil 47. Opening of contact 46$^d$ effects discharge of capacitor 136 which after a time interval causes energization of electromagnet 147$^a$, such energization effecting in turn opening of contacts 147$^b$ and 147$^c$. Opening of contacts 147$^b$ interrupts supply of ignition potential to tubes 17 and 18 and thus interruption of welding current, while relays 46 and 47 remain energized. Opening of contacts 147$^c$ causes after a time interval energization of relay 148 which closes contacts 148$^b$ and opens contacts 148$^c$. If relay 47 is energized at this moment, contact 47$^b$ is open, and as contact 46$^d$ is also open, the tube 128 remains unblocked and relay 147 remains energized, keeping contacts 147$^b$ and 147$^c$ open. This after a time interval causes in the manner described for the other tubes and coils energization of coil 148 and closure of contact 148$^b$, and opening of contact 148$^c$. As a result tube 28 is unblocked after a time interval and coil 48$^a$ is energized, opening contact 48$^b$ to deenergize the magnet 15$^b$, and after the pressure in the cylinder 10 has decreased the contacts 16$^b$ are opened to interrupt current supply to tube 26. This interposes a second gap in the ignition circuit of tubes 17 and 18. Contacts 48$^c$ are also opened, thus unblocking tube 29 to energize relay 49 which opens maintaining contacts 49$^b$ for the coils 50$^a$ and 55$^a$, returning the system to initial conditions.

When adjusted as described so far a single welding current pulse is obtained upon each depression and release of the push button switch 57. If it is desired to obtain repeated cyclic operation of the system as long as push button switch 57 is closed, the switch 56 is moved to its lower position, and the push button switch 57 is thus connected in series with contacts 49$^b$. Hence after deenergization of relay 49 upon completion of a cycle, contacts 49$^b$ are reclosed and as long as push button switch 57 is held closed the entire cycle as described will be repeated.

If it is desired to obtain an intermittent supply of welding current with interspersed cooling periods during a complete operating cycle, the period required to discharge the capacitor 35 to a potential which permits conduction of tube 27 is adjusted so that it is several times the discharge period of capacitors 136 and 137. Hence when contacts 46$^c$ and 46$^d$ are opened and 46$^b$ is closed upon energization of relay 46 to cause flow of welding current, the tube 128 becomes conducting after a time interval and relay 147 is energized. The welding current is interrupted by opening of contacts 147$^b$. Shortly thereafter relay 148 is energized, as contacts 147$^c$ also open. This closes contacts 148$^b$, and as contacts 47$^b$ are still closed, the contacts 46$^d$ are paralleled and the capacitor 136 is charged to block tube 128 and deenergize relay 147, again closing the ignition circuit for tubes 17 and 18 by closure of contacts 147b. This again causes flow of welding current. Deenergization of relay 147 causes contacts 147c to close and capacitor 137 is charged to block tube 129 which deenergizes relay 148. Contacts 148b are opened again, and after a time interval relay 147 is reenergized and contacts 147c are opened, thus again reenergizing relay 148 after a time interval. The alternate energization of relays 147 and 148 and the resulting alternate supply and interruption of welding current is repeated until capacitor 35 is sufficiently discharged to permit energization of relay 47. Upon such energization contacts 47b are opened and this prevents further energization of relays 147 and 148, whereupon relays 48 and 49 are successively energized and the cycle is completed as already described. It should be pointed out that depending upon the relative adjustment of the several discharge circuits the relay 47 may be energized so that the last period of energization of relay 147 will be a fraction of the period of relay 147 preset by its own turning means, thus affording a fine gradation of the last period of flow of welding current.

The aforedescribed alternation between heating and cooling may be employed either for a single cycle setting or for repetitive cycle setting of the switch 56. In either case the contacts 47c open to effect energization of relay 48 to complete the welding cycle as described. Thus it is possible to obtain several complete current pulses or several complete and a final fractional current pulse during a cycle of intermittent heating and cooling operation.

I claim:

1. The combination with an alternating current source, of a plurality of electroresponsive windings, a like number of grid type electron tubes individualized to said windings and interposed between the same and said source, individual grid circuits for said tubes supplied from said source and comprising capacitors which when charged block discharge of said tubes thereby to deenergize said windings, a translating circuit, and contacts operable by said windings including control contacts for said translating circuit and also contacts for controlling charging and discharging of said capacitors, certain of said grid circuits being adjustable in respect of time required for capacitor discharge to render selective different predetermined cycles of control of said windings, one such cycle being characterized by completion of said translating circuit for a single period of limited duration, and another such cycle being characterized by completion of said translating circuit for successive periods of limited number.

2. The combination with an alternating current source, of a plurality of electroresponsive windings, a like plurality of grid type electron tubes individualized to said windings and interposed between the same and said source, individual grid circuits for said tubes supplied from said source and comprising capacitors which when charged block discharge of said tubes thereby to deenergize said windings, a translating circuit, and contacts operable by said windings including control contacts for said translating circuit and also contacts for controlling charging and discharging of said capacitors, certain of said grid circuits being adjustable in respect of time required for capacitor discharge, to render selective different predetermined cycles of control of said windings, one such cycle being characterized by completion of said translating circuit for a single period of limited duration, and another such cycle being characterized by completion of said translating circuit for successive periods of limited duration and limited number, final interruption of said translating circuit being in both instances a function of response of a given one of said windings.

3. The combination with an alternating current source, of a plurality of electroresponsive windings, a like plurality of grid type electron tubes individualized to said windings and interposed between the same and said source, individual grid circuits for said tubes supplied from said source and comprising capacitors which when charged block discharge of said tubes thereby to deenergize said windings, a translating circuit, and contacts operable by said windings including control contacts for said translating circuit and also contacts for controlling charging and discharging of said capacitors, certain of said grid circuits being adjustable in respect of time required for capacitor discharge to render selective different predetermined cycles of control of said windings, one such cycle having an early step thereof characterized by completion of said translating circuit for a single period of limited duration and another such cycle having such early step thereof characterized by completion of said translating circuit for successive periods of limited duration and limited number, final interruption of said translating circuit being in both instances a function of response of a given one of said windings as is also initiation of a following step common to both cycles.

4. The combination with an alternating current source, of a plurality of electroresponsive windings, a like number of grid type electron tubes individualized to said windings and interposed between the same and said source, individual grid circuits for said tubes supplied from said source and each comprising a rectifier, a capacitor which when charged blocks discharge of the respective tube thereby to deenergize the respective winding, and individual discharge resistors connected across said capacitors tending to discharge the same, a translating circuit, and contacts operable by said windings including control contacts for translating circuit and also contacts for controlling charging and discharging of said capacitors, certain of said grid circuits being adjustable in respect of time required for capacitor discharge, to different predetermined cycles of control of said windings selectively, one such cycle being characterized by completion of said translating circuit for a single period of limited duration, and another such cycle being characterized by completion of said translating circuit for successive periods of limited duration and limited number.

5. The combination with an alternating current source, of a plurality of electroresponsive windings, a like number of grid type electron tubes individualized to said windings and interposed between the same and said source, individual grid circuits for said tubes supplied from said source and each comprising a rectifier, a capacitor which when charged blocks discharge of the respective tube thereby to deenergize the respective winding and individual discharge resistors connected across said capacitors tending to discharge same, a translating circuit, and contacts operable by said windings including control contacts for said translating circuit and also contacts for controlling charging and discharging of said capacitors, certain of said grid circuits being adjustable in respect of time required for capacitor discharge, for affording different predetermined cycles of control of said windings selectively, one such cycle being characterized by completion of said translating circuit for a single period of limited duration, and another such cycle being characterized by completion of said translating circuit for successive periods of limited duration and limited number, final interruption of said translating circuit being in both instances a function of response of a given one of said windings.

6. The combination with an alternating current source, of a plurality of electroresponsive windings, a like number of grid type electron tubes individualized to said windings and interposed between the same and said source, individual grid circuits for said tubes supplied from said source and comprising rectifiers, capacitors which when charged block discharge of said tube, thereby to deenergize said windings, and individual discharge resistors connected across said capacitors tending to discharge same, a translating circuit, and contacts operable by said windings including control contacts for said translating circuit and also contacts for controlling charging and discharging of said capacitors, certain of said grid circuits being adjustable in respect of time required for capacitor discharge to render selective different predetermined cycles of control of said windings, one such cycle having an early step thereof characterized by completion of said translating circuit for a single period of limited duration and another such cycle having such early step thereof characterized by completion of said translating circuit for successive periods of limited duration and limited number, final interruption of said translating circuit being in both instances a function of response of a given one of said windings as is also initiation of a following step common to both cycles.

7. A cyclic controller operable when supplied with alternating current to perform a given function for a single period of limited duration, or alternatively for a limited number of successive periods each of given duration, comprising in combination, first, second and third electroresponsive windings, grid type electron tubes individualized to said windings to conduct current thereto from an alternating current source, individual grid circuits for said tubes, each of said circuits to be subjected to an alternating potential and each including a capacitor, a discharge resistor connected across said capacitor and a rectifier in the charging connection for said capacitor, and automatically operating contacts to make and break the charging connections of said capacitors, said contacts, of which certain are operable by said windings, being effective according to adjustment of said grid circuits in respect of time required for discharge of their said capacitors, to cause said tubes to energize said three windings in a given order and only once or alternatively to energize said second and third windings sequentially and repeatedly pending energization of said first winding and to energize said first winding subject to a given time delay thereby to stop repetition of energization of said second and third windings.

GEORGE J. LEXA.

REFERENCES CITED

The following references are of record in the file of this patent:

UNITED STATES PATENTS

| Number | Name | Date |
|---|---|---|
| 2,372,129 | Smith | Mar. 20, 1945 |
| 2,390,982 | Bivens | Dec. 18, 1945 |
| 2,415,396 | Undy | Feb. 4, 1947 |
| 2,421,994 | Cooper | June 10, 1947 |